US010060829B2

United States Patent
Hanawa et al.

(10) Patent No.: US 10,060,829 B2
(45) Date of Patent: Aug. 28, 2018

(54) DIAGNOSIS DEVICE

(71) Applicant: ISUZU MOTORS LIMITED, Tokyo (JP)

(72) Inventors: Satoshi Hanawa, Fijisawa (JP); Tadashi Uchiyama, Kamakura (JP); Hidekazu Fujie, Yamato (JP); Teruo Nakada, Yokohama (JP); Naoto Murasawa, Yamato (JP)

(73) Assignee: ISUZU MOTORS LIMITED, Tokyo (JP)

( * ) Notice: Subject to any disclaimer, the term of this patent is extended or adjusted under 35 U.S.C. 154(b) by 274 days.

(21) Appl. No.: 15/025,082

(22) PCT Filed: Sep. 26, 2014

(86) PCT No.: PCT/JP2014/075668
§ 371 (c)(1),
(2) Date: Mar. 25, 2016

(87) PCT Pub. No.: WO2015/046445
PCT Pub. Date: Apr. 2, 2015

(65) Prior Publication Data
US 2016/0245722 A1 Aug. 25, 2016

(30) Foreign Application Priority Data

Sep. 27, 2013 (JP) ................................. 2013-201197

(51) Int. Cl.
F01N 3/00 (2006.01)
F01N 3/02 (2006.01)
(Continued)

(52) U.S. Cl.
CPC ........... G01M 15/102 (2013.01); F01N 11/00 (2013.01); F01N 2550/04 (2013.01);
(Continued)

(58) Field of Classification Search
CPC ................. F01N 11/00; F01N 2550/04; F01N 2900/0408; F01N 2900/0418; F01N 2900/0422
(Continued)

(56) References Cited

U.S. PATENT DOCUMENTS

2012/0011829 A1\* 1/2012 Taibi ....................... F01N 3/103
60/274
2012/0144813 A1 6/2012 Yahata et al.
(Continued)

FOREIGN PATENT DOCUMENTS

EP 2 977 574 A1 1/2016
JP 2009-144577 7/2009
(Continued)

OTHER PUBLICATIONS

Espacenet Bibliographic data, Publication No. 2012-122399, published Jun. 28, 2012.
(Continued)

Primary Examiner — Phutthiwat Wongwian
Assistant Examiner — Diem Tran
(74) Attorney, Agent, or Firm — Staas & Halsey LLP

(57) ABSTRACT

A diagnosis device includes: a diesel particulate filter (DPF) collecting particulate matter (PM) in exhaust gas; a resistive type PM sensor provided downstream of the DPF, detecting an amount of PM from current flowing through PM deposited between electrodes. An actual regeneration interval calculator calculating an actual interval from completion of regeneration of the sensor to a start of the next regeneration; a PM slippage amount calculator estimating an amount of PM slippage in exhaust gas that slips through the DPF, assuming the DPF is normal; an estimated regeneration interval calculator calculating, on the basis of the PM slippage amount, an estimated interval from completion of
(Continued)

the regeneration of the sensor to the start of the next regeneration; and a DPF failure-normal determination device determining whether the DPF has failed or is normal by comparing the actual interval to the estimated interval.

6 Claims, 6 Drawing Sheets

(51) Int. Cl.
   *G01M 15/10* (2006.01)
   *F01N 11/00* (2006.01)
(52) U.S. Cl.
   CPC .. *F01N 2560/05* (2013.01); *F01N 2900/0408* (2013.01); *F01N 2900/0416* (2013.01); *F01N 2900/0418* (2013.01); *F01N 2900/0422* (2013.01); *Y02T 10/47* (2013.01)
(58) Field of Classification Search
   USPC .................................. 60/286, 301, 303, 324
   See application file for complete search history.

(56) References Cited

U.S. PATENT DOCUMENTS

2013/0086888 A1    4/2013  Lee et al.
2013/0312389 A1*  11/2013  Yanakiev ................ F01N 11/00
                                                              60/274

FOREIGN PATENT DOCUMENTS

| JP | 2012-122399 | 6/2012 |
| JP | 2013-68197  | 4/2013 |
| JP | 2013-83241  | 5/2013 |
| JP | 2014-185541 | 10/2014 |

OTHER PUBLICATIONS

Espacenet Bibliographic data, Publication No. 2013-83241, published May 9, 2013.

Japanese Platform for Patent Information, English Abstract of Japanese Patent Publication No. 2013-68197, published Apr. 18, 2013.

Japanese Platform for Patent Information, English Abstract of Japanese Patent Publication No. 2009-144577, published Jul. 2, 2009.

International Search Report dated Dec. 22, 2014, in corresponding International Application No. PCT/JP2014/075668.

International Preliminary Report on Patentability dated Mar. 29, 2016 in corresponding International Patent Application No. PCT/JP2014/075668.

* cited by examiner

DIAGNOSIS DEVICE

CROSS-REFERENCE TO RELATED APPLICATIONS

This application is a U.S. National Stage Application, which claims the benefit under 35 U.S.C. § 371 of PCT International Patent Application No. PCT/JP2014/075668, filed Sep. 26, 2014, which claims the foreign priority benefit under 35 U.S.C. § 119 of Japanese Patent Application No. 2013-201197, filed Sep. 27, 2013, the contents of which are incorporated herein by reference.

TECHNICAL FIELD

The present invention relates to a diagnosis device, and more particularly, relates to a failure diagnosis of an exhaust gas purification filter provided in an exhaust system of an internal combustion engine.

BACKGROUND ART

As an exhaust gas purification filter provided in an exhaust system such as a diesel engine, a Diesel Particulate Filter (DPF) has been known that collects a Particulate Matter (PM) such as soot or the like contained in an exhaust gas.

When a PM collection capability of the DPF is deteriorated due to the breakage or the like, the PM, which is not collected by the DPF and is slipped through the DPF, is emitted in an atmospheric air, so that it is possible that an exhaust gas regulation value cannot be satisfied. For this reason, there is a demand to perform an on-board diagnosis of the failure of the DPF.

As a technique for determining the failure of the DPF, for example, there is known a method in which a resistive type PM sensor is provided at a downstream side of the DPF to compare a sensor value and a reference threshold (see, for example, PATENT LITERATURE DOCUMENT 1).

LISTING OF REFERENCES

PATENT LITERATURE DOCUMENT 1: Japanese Patent Application Laid-Open Publication (Kokai) No. 2009-144577

In general, a resistive type PM sensor detects a PM amount using that a resistive value between electrodes changes due to a conductive PM which is deposited between a pair of electrodes. However, in the resistive type PM sensor, an accurate PM amount cannot be possibly detected, because an electrical resistance of the PM deposited between the electrodes changes when an exhaust gas temperature or an exhaust gas flow rate affects the resistive type PM sensor. For this reason, according to the diagnosis method based on a sensor value of the resistive type PM sensor, there is a problem in which the deterioration of a DPF may not be accurately determined.

SUMMARY OF THE INVENTION

A device disclosed herein has been made in order to determine the failure of the DPF with higher accuracy.

The device disclosed herein includes: a filter that collects a particulate matter in an exhaust gas emitted from an internal combustion engine; a sensor that is provided at a downstream side of the filter and that detects an amount of the particulate matter based on a current flowing through the particulate matter deposited between electrodes, and for which regeneration is possible that combusts and eliminates the particulate matter when the particulate matter deposited between the electrodes reaches to a predetermined amount; actual interval calculating means that calculates an actual interval from a completion of the regeneration of the sensor to a start of a next regeneration; a slippage amount estimator that estimates an amount of a slippage of the particulate matter in the exhaust gas that is emitted from the internal combustion engine and is slipped through the filter assuming a collection capability of the filter being normal; estimated interval calculating means that calculates an estimated interval from the completion of the regeneration of the sensor to the start of the next regeneration of the sensor based on the particulate matter slippage amount; and determining means that determines at least failure of the filter by comparing the actual interval to the estimated interval.

Advantages of the Invention

According to a device disclosed herein, the failure of a DPF can be determined with higher accuracy.

DETAILED DESCRIPTION

Figure 1:
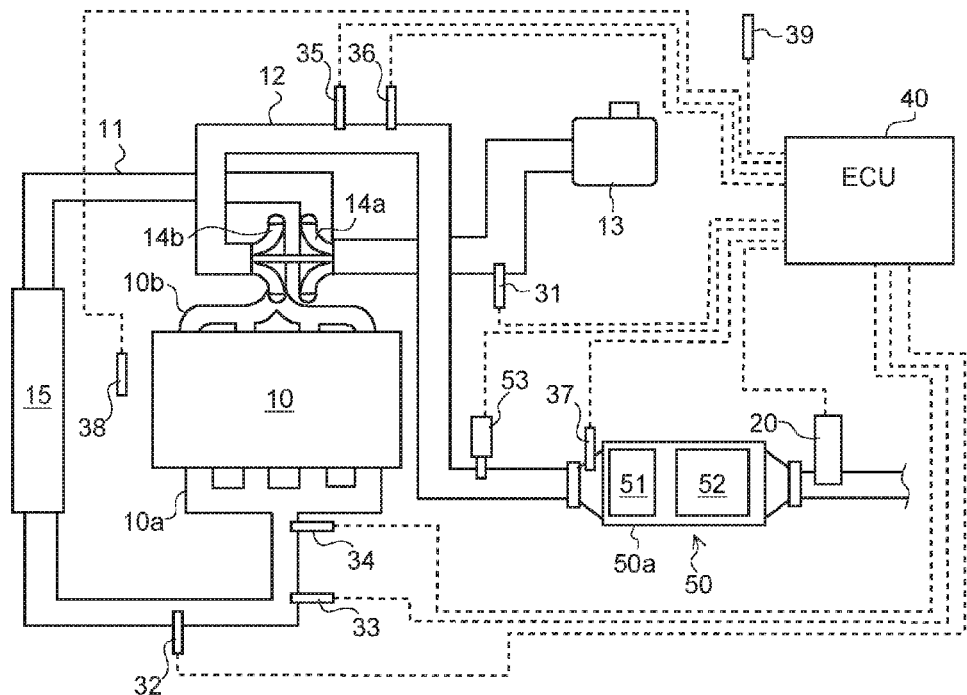
FIG. 1 is an overall configuration diagram schematically illustrating an intake and exhaust system of an engine to which a diagnosis device according to an embodiment of the present invention is adopted.

Hereinafter, a diagnosis device according to an embodiment of the present invention will be described with reference to accompanying drawings. Identical parts are given identical reference numerals and symbols, and their names and functions are identical as well. Therefore, detailed description of such parts will not be repeated.

As illustrated in FIG. 1, a diesel engine (hereinafter simply referred to as "engine") 10 is provided with an intake manifold 10a and an exhaust manifold 10b. The intake manifold 10a is connected to an intake passage 11 for introducing fresh air, and the exhaust manifold 10b is connected to an exhaust passage 12 for emitting an exhaust gas to the atmospheric air.

The intake passage 11 is provided with, in turn from the intake upstream side, an air cleaner 13, a mass air flow (MAF) sensor 31, a compressor of a turbo charger 14a, an intercooler 15, an intake temperature sensor 32, an intake oxygen concentration sensor 33, a boost pressure sensor 34 and the like. The exhaust passage 12 is provided with, in turn from the exhaust upstream side, a turbine of the turbo charger 14b, an exhaust oxygen concentration sensor 35, an air-fuel ratio sensor 36, an exhaust gas temperature sensor 37, an exhaust gas aftertreatment device 50 and the like. It should be noted that, in FIG. 1, the reference sign 38 denotes an engine rotation sensor, and the reference sign 39 denotes an accelerator opening sensor.

The exhaust gas aftertreatment device 50 is configured to be arranged with, in turn from the exhaust upstream side in a catalyst case 50a, an oxidation catalyst (Diesel Oxidation Catalyst: DOC) 51, and a DPF 52. Also, an exhaust pipe injection device 53 is provided at the exhaust upstream side of the DOC 51, and a resistive type PM sensor 20 for detecting the PM amount in the exhaust gas that is slipped through the DPF 52 is provided at the downstream side of the DPF 52, respectively.

The exhaust pipe injection device 53 injects an unburned fuel (mainly an HC) in the exhaust gas passage 12 in response to an instruction signal which is output from an electronic control unit (hereinafter referred to as "ECU") 40. It should be noted that the exhaust pipe injection device 53 may be omitted when a post injection by way of a multiple stage injection of the engine 10 is used.

The DOC 51 is formed such that the catalytic component is supported by a ceramic carrier surface of a cordierite honeycomb structural body or the like. The DOC 51, when the HC is supplied by the exhaust pipe injection device 53 or the post injection, oxidizes the HC to elevate the exhaust gas temperature.

The DPF 52 is formed such that, for example, a number of cells, which are compartmented with porous partition walls, are arranged in the direction of the exhaust gas flow, and the upstream side and the downstream side of cells seal open ends of each other. The DPF 52 collects the PM in the exhaust gas with pores of the partition walls or surfaces thereof. Furthermore, the DPF 52 performs a so-called filter forced regeneration that combusts and eliminates the PM when the PM deposited amount reaches to the predetermined amount. The filter forced regeneration is performed by supplying the unburned fuel (HC) to the DOC 51 with the exhaust pipe injection device 53 or the post injection to elevate the exhaust gas temperature of the exhaust gas flowing in the DPF 52 up to the PM combustion temperature (for example, approximately 600 degrees Celsius).

Figure 2:
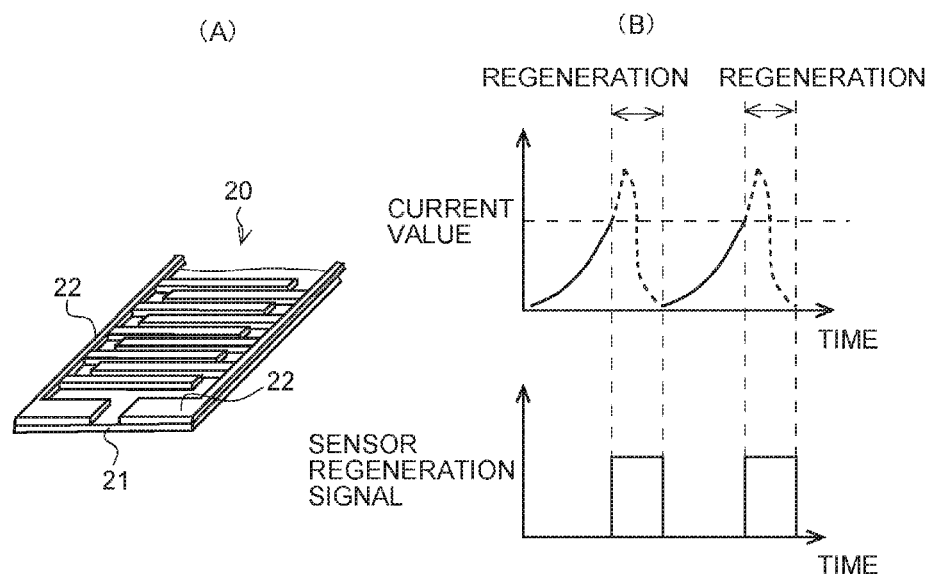
FIG. 2(A) is a perspective view schematically illustrating a main part of a resistive type PM sensor according to an embodiment of the present invention.
FIG. 2(B) is a view illustrating a sensor regeneration signal of the resistive type PM sensor.

The resistive type PM sensor 20 is, as illustrated in FIG. 2(A), provided with a pair of electrodes of the comb teeth shape to which the voltage is applied on an insulated substrate 21. The resistive type PM sensor 20 detects the PM amount using that the resistive value between the electrodes 22 changes due to a deposition of conductive PM. Furthermore, the resistive type PM sensor 20 is provided with a heater (not illustrated) and, as illustrated in FIG. 2(B), performs the sensor regeneration that heats the PM to combust and eliminate the PM when the PM deposited between the electrodes 22 reaches the prescribed amount. This sensor regeneration signal (start signal and completion signal) is output to the electrically connected ECU 40.

The ECU 40 performs various controls of the engine 10 or the exhaust pipe injection device 53 or the like. The ECU 40 is configured to have a known CPU, a ROM, a RAM, an input port, an output port and the like.

Figure 3:
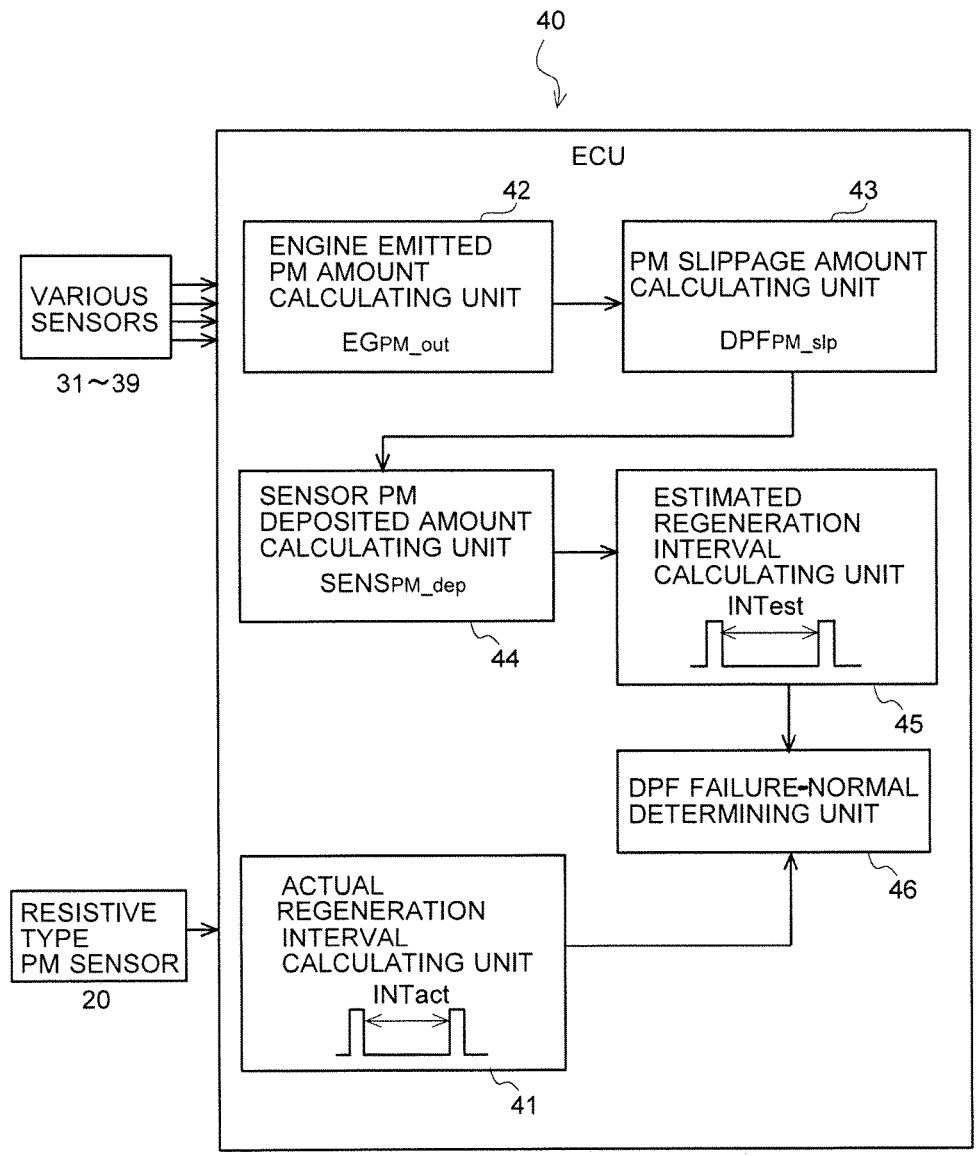
FIG. 3 is a functional block diagram illustrating an electronic control unit (ECU) 40 according to an embodiment of the present invention.

Furthermore, the ECU 40 has, as illustrated in FIG. 3, an actual regeneration interval calculating unit 41, an emitted exhaust PM amount calculating unit 42, a PM slippage amount calculating unit 43, a sensor PM deposited amount calculating unit 44, an estimated regeneration interval calculating unit 45, and a DPF failure-normal determining unit 46, as a subset of functional components thereof. Although those functional components will be described as being included in the ECU 40 of integrated hardware, alternatively, any part of those may be provided in a separate hardware.

The actual regeneration interval calculating unit 41 is an exemplary means of the actual interval calculating means of the present invention and calculates an interval from a completion of the regeneration of the resistive type PM sensor 20 to a start of a next regeneration of the resistive type PM sensor 20 (hereinafter referred to as "actual regeneration interval $INT_{act}$"). The actual regeneration interval $INT_{act}$ is calculated based on the regeneration start signal and the regeneration completion signal both of which are input from the resistive type PM sensor 20.

The engine emitted PM amount calculating unit 42 calculates in real time the PM amount in the exhaust gas emitted from the engine 10 (hereinafter referred to as "engine emitted PM amount $EG_{PM\ out}$"). The engine emitted PM amount $EG_{PM\ out}$ can be obtained from, for example, a model formula or the like having an input value containing an oxygen concentration O2, an air-fuel ratio λ, an exhaust gas temperature T or the like of the intake and exhaust system which are detected with the various sensors 31 to 39. Furthermore, engine emitted PM amount $EG_{PM\ out}$ can be obtained by reading out a value corresponding to an operational status of the engine 10 based on a number of the engine rotation N or the accelerator opening Q, which is detected with the sensors 38 and 39, from a PM emission amount map (not illustrated) prepared in an experiment or the like.

The PM slippage amount calculating unit 43 configures a part of the slippage amount estimator of the present invention and calculates in real time an amount of the PM that is not collected by the DPF 52 and slipped through the DPF 52 (hereinafter referred to as "PM slippage amount $DPF_{PM\ slp}$"). More particularly, the ECU 40 stores a PM slippage ratio $SLP_\%$ in the case that the PM collection capability of the DPF 52, which is obtained in the experiment or the like in advance, is assumed normal. The PM slippage amount $DPF_{PM\ slp}$ can be obtained by multiplying the engine emitted PM amount $EG_{PM\ out}$, which is calculated by the engine emitted PM amount calculating unit 42, by the PM slippage ratio $SLP_\%$.

It should be noted that the PM slippage ratio $SLP_\%$; is preferably set with reference to a status immediately before the DPF 52 breaks down due to melting or the like. By doing this, during the failure diagnosis, which will be described below, it is possible to detect the failure for sure immediately before the amount of the PM, which is slipped thought the DPF 52, exceeds the exhaust gas regulation value or the like.

The sensor PM deposited amount calculating unit 44 calculates, based on the PM slippage amount $DPF_{PM\ slp}$ calculated by the PM slippage amount calculating unit 43 in real time, a PM deposited amount $SENS_{PM\ dep}$ which is deposited between the electrodes 22 of the resistive type PM sensor 20. The PM deposited amount $SENS_{PM\ dep}$ can be obtained from a model formula having an input value containing the PM slippage amount $DPF_{PM\ slp}$, the exhaust gas temperature T, the exhaust gas flow rate Q and the like.

The exhaust gas flow rate Q can be calculated based on a detection value of the MAF sensor 31 and a fuel injection amount of the engine 10 or the like, or alternatively, can be directly obtained from an exhaust gas flow rate sensor, which is not illustrated.

The estimated regeneration interval calculating unit 45 configures a part of the estimated interval calculating means of the present invention, and calculates an interval from a completion of the regeneration of the resistive type PM sensor 20 to a start of the next regeneration of the resistive type PM sensor 20 (hereinafter this interval is referred to as "estimated regeneration interval $INT_{est}$") in the case that the PM collection capability of the DPF 52 is assumed normal. More particularly, the estimated regeneration interval calculating unit 45 is configured to calculate, as the estimated regeneration interval $INT_{est}$, an interval from the completion of the regeneration of the resistive type PM sensor 20 to when an integrated value of the PM deposition amount $SENS_{PM\,dep}$, which is calculated by the sensor PM deposited amount calculating unit 44, reaches a sensor regeneration start threshold.

The DPF failure-normal determining unit 46 determines the failure or the normality of the DPF 52 base on the actual regeneration interval $INT_{act}$, which is calculated by the actual regeneration interval calculating unit 41, and the estimated regeneration interval $INT_{est}$, which is calculated by the estimated regeneration interval calculating unit 45. Hereinafter, a more particular determination method will be described below with reference to FIGS. 4 to 6 in detail.

Figure 4:
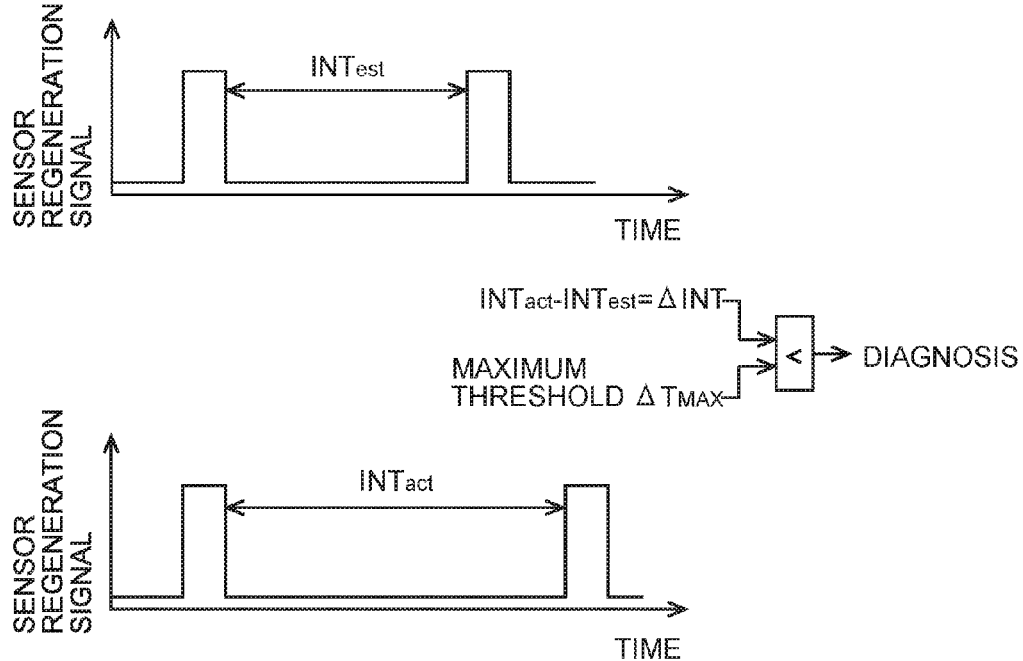
FIG. 4 is a diagram illustrating an exemplary failure diagnosis according to an embodiment of the present invention.

The determining method illustrated in FIG. 4 uses a difference between the actual regeneration interval $INT_{act}$ and the estimated regeneration interval $INT_{est}$. In this determination method, the DPF 52 is determined as being in failure when the difference ΔINT between the actual regeneration interval $INT_{act}$ and the estimated regeneration interval $INT_{est}$ exceeds the predetermined maximum threshold $\Delta T_{max}$. The maximum threshold $\Delta T_{max}$ is preferably set with reference to a status immediately before the amount of the PM slippage that is slipped through the DPF 52 due to, for example, melting or the like does no more satisfy the exhaust gas regulation value (i.e., a normal product immediately before the failure).

Figure 5:
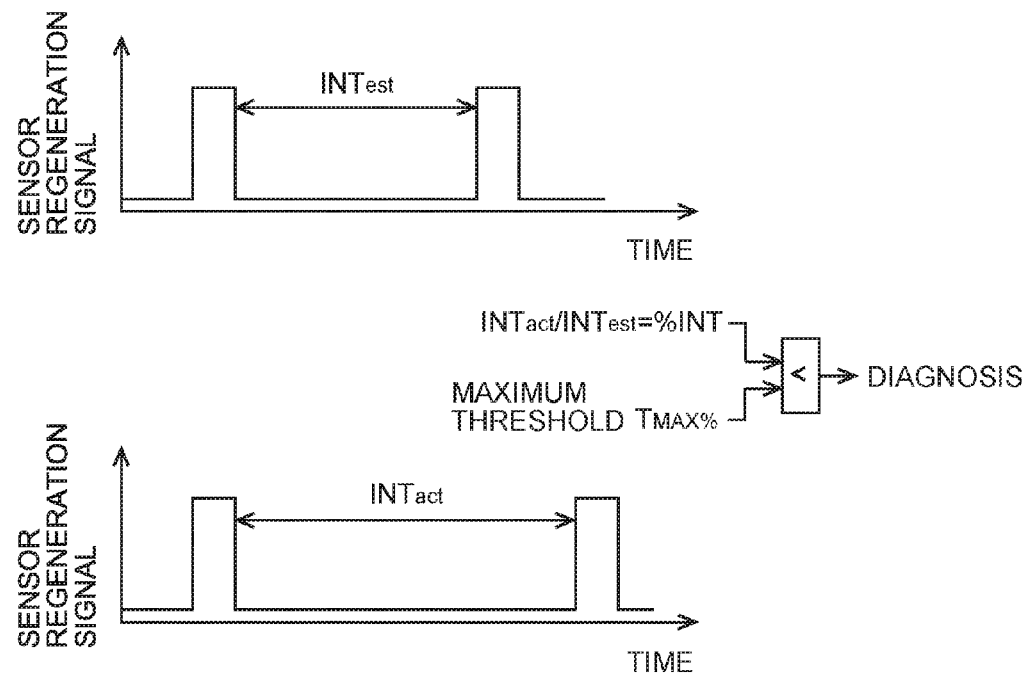
FIG. 5 is a diagram illustrating an exemplary failure diagnosis according to an embodiment of the present invention.

The determining method illustrated in FIG. 5 uses a ratio between the actual regeneration interval $INT_{act}$ and the estimated regeneration interval $INT_{est}$. In this determination method, the DPF 52 is determined as being in failure when the ratio % INT calculated by dividing the actual regeneration interval $INT_{act}$ by the estimated regeneration interval $INT_{est}$ exceeds the predetermined maximum threshold $T_{max\,\%}$. The maximum threshold $T_{max\,\%}$ is, similarly to the example in FIG. 4, preferably set with reference to a status immediately before the amount of the PM slippage that is slipped through the DPF 52 no longer satisfies the exhaust gas regulation value.

Figure 6:
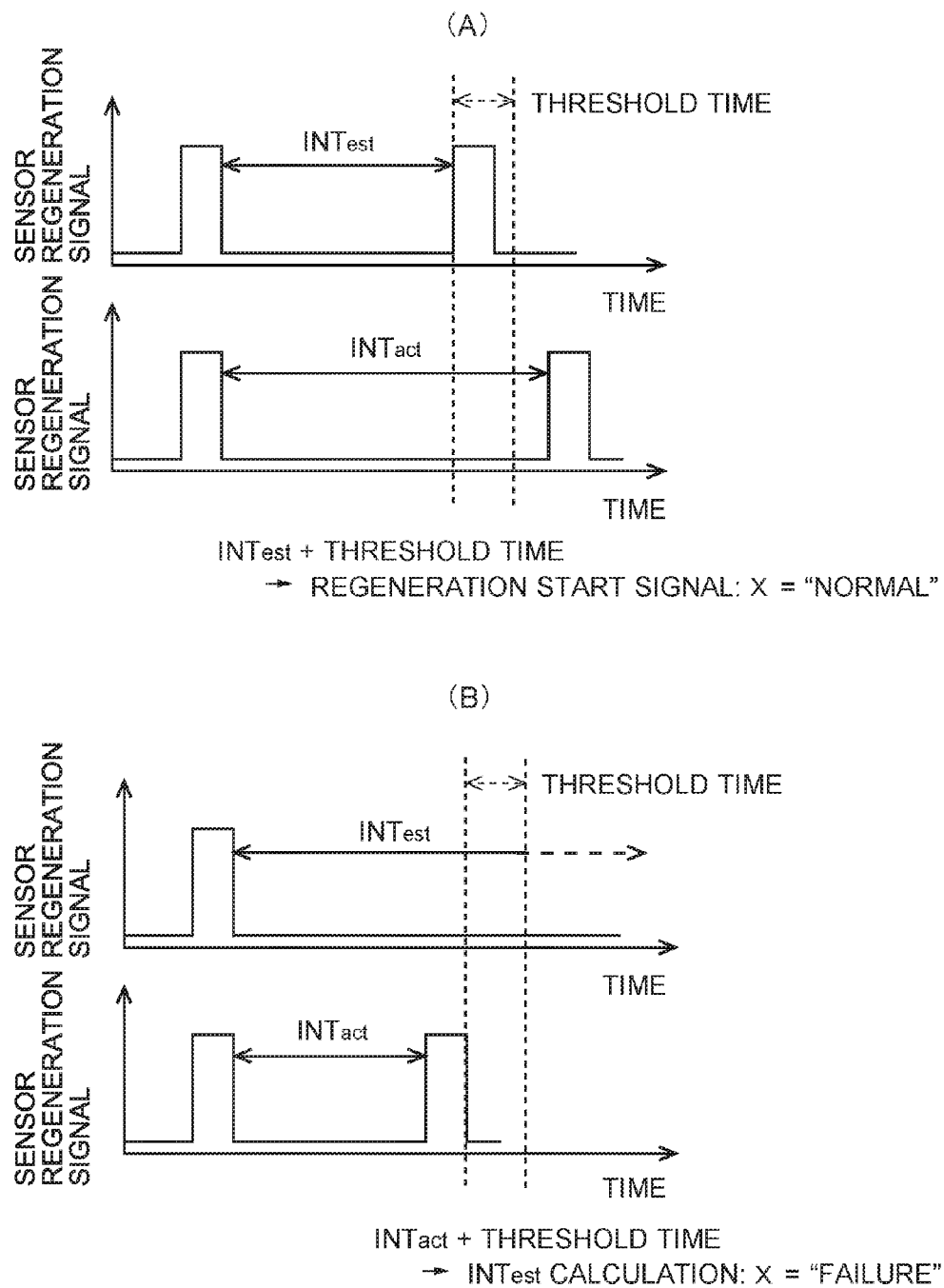
FIGS. 6A and 6B are diagrams illustrating exemplary failure diagnoses according to an embodiment of the present invention.

The determining method illustrated in FIG. 6 aims to shorten the diagnosis time and to increase the number of diagnoses. In FIG. 6(A), the DPF 52 is determined as being normal when the next sensor regeneration start signal is not input after the prescribed threshold time elapses from the completion of the calculation of the estimated regeneration interval $INT_{est}$. By doing this, it is possible to determine the normal status of the DPF 52 earlier without the need for waiting for the completion of the calculation of the actual regeneration interval $INT_{act}$ when the DPF 52 is normal.

In FIG. 6(B), the DPF 52 is determined as being in failure when the calculation of the estimated regeneration interval $INT_{est}$ is not completed after the prescribed threshold time elapses from the coimpletion of the calculation of the actual regeneration interval $INT_{act}$. By doing this, it is possible to determine the normal status of the DPF 52 earlier without the need for waiting for the completion of the calculation of the estimated regeneration interval $INT_{est}$ when the DPF 52 is considerably deteriorated.

Next, referring to FIGS. 7 and 8, a control flow according to the diagnosis device of the present embodiment will be described. It should be noted that the present control starts at the same time as the ignition key operation: ON.

Figure 7:
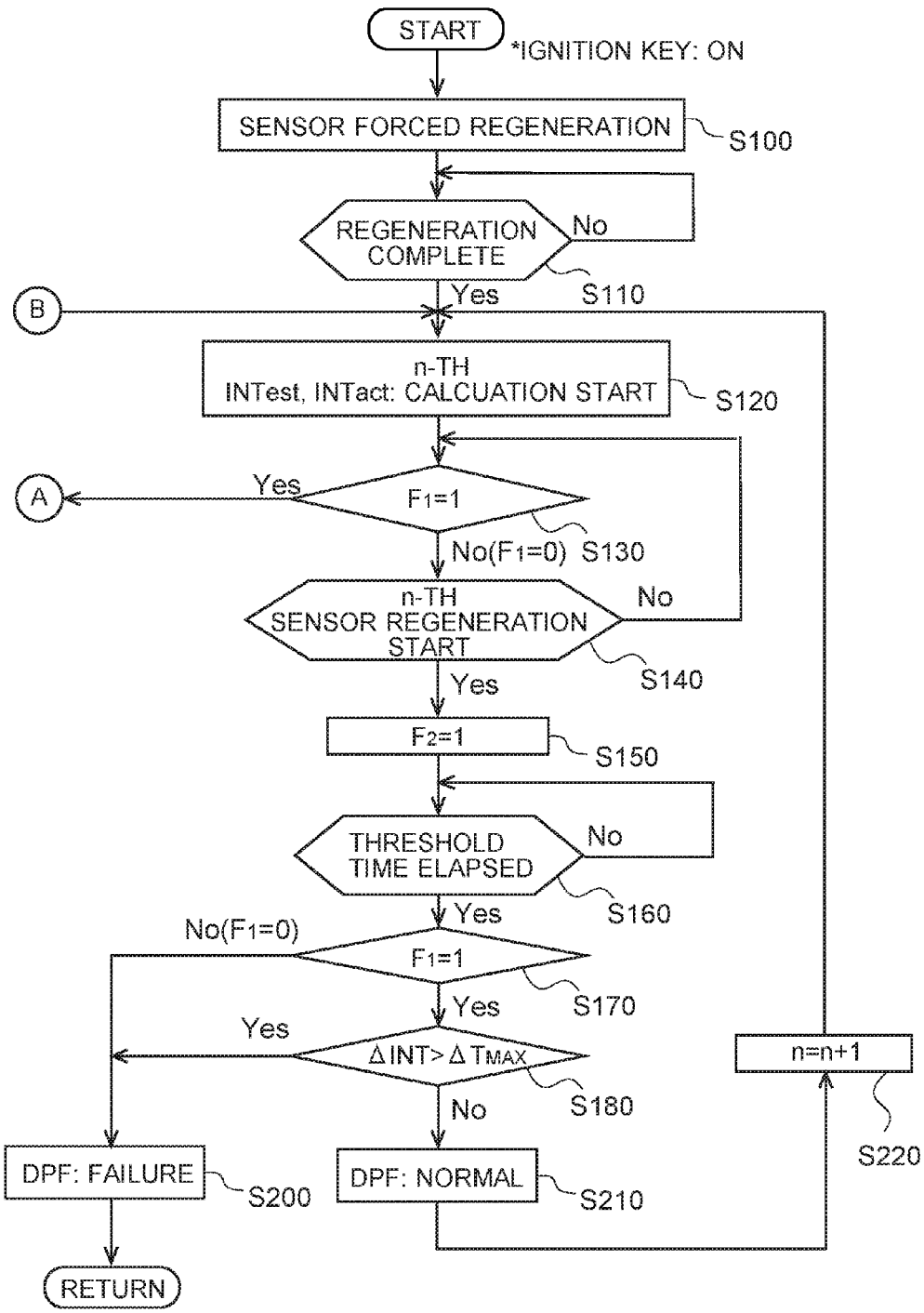
FIG. 7 is a flowchart illustrating a control by the diagnosis device according to an embodiment of the present invention.
Figure 8:
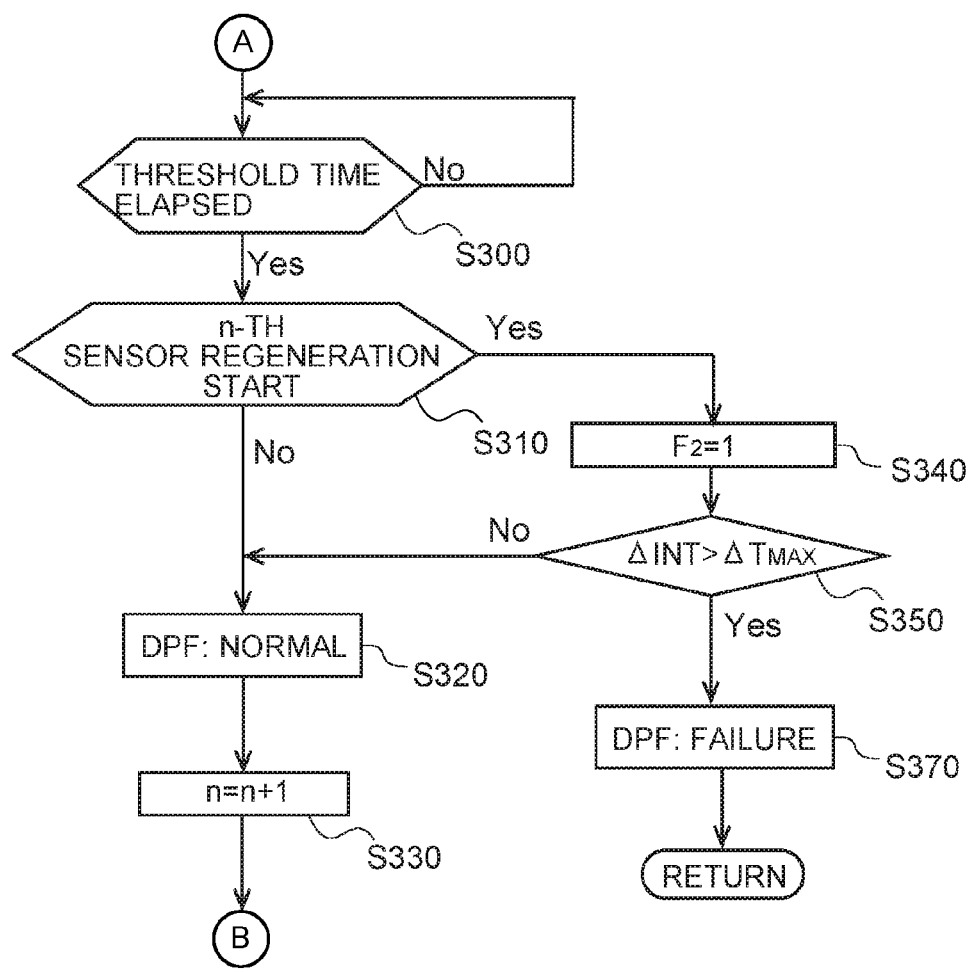
FIG. 8 is a flowchart illustrating a control by the diagnosis device according to an embodiment of the present invention.

As illustrated in FIG. 7, in the step 100 (hereinafter the step being simply referred to as "S"), the sensor forced regeneration is performed regardless of the PM deposited amount deposited between the electrodes 22 of the resistive type PM sensor 20. In S110, it is determined whether the sensor forced regeneration is completed or not. If the sensor forced regeneration is completed (Yes), it proceeds to S120 to start the calculation of the n-th (n=1) estimated regeneration interval $INT_{est}$ and the actual regeneration interval $INT_{act}$.

In S130, it is determined whether the calculation of the estimated regeneration interval $INT_{est}$ is completed or not. If a completion flag $F_1$ is set ON ($F_1$=1) indicating that the calculation of the estimated regeneration interval $INT_{est}$ is completed (Yes), then it proceeds to S300 in FIG. 8, which will be described below. On the other hand, if the calculation of the estimated regeneration interval $INT_{est}$ is not yet completed (No), then it proceeds to S140.

In S140, it is determined whether the n-th (n=1) sensor regeneration is started or not. If the sensor regeneration is started (Yes), this means that the calculation of the actual regeneration interval $INT_{act}$ is completed, then in S150, a completion flag $F_2$ is set ON ($F_2$=1) indicating that the calculation of the actual regeneration interval $INT_{act}$ is completed, and it proceeds to S160.

In S160, it is determined whether the predetermined threshold time elapses from when the completion flag F2 is set ON. In S170, it is determined whether the completion flag $F_1$ of the actual regeneration interval $INT_{act}$ is set ON ($F_1$=1) or not. If the completion flag $F_1$ is not ON (No) in S170, the present control proceeds to S200 and the DPF 52 is determined as being in failure to return, which means that the calculation of the estimated regeneration interval $INT_{est}$ is not yet completed after the threshold time elapses from the calculation of the actual regeneration interval $INT_{act}$.

On the other hand, in S170, if the completion flag $F_1$ is ON (Yes), this means that the calculation of both of the actual regeneration interval $INT_{act}$ and the estimated regeneration interval $INT_{est}$ are completed, then in S180 the comparison of those intervals is performed.

In S180, if the deference ΔINT between the actual regeneration interval $INT_{act}$ and the estimated regeneration interval $INT_{est}$ exceeds the predetermined maximum threshold $\Delta T_{max}$ (Yes), then it proceeds to S200 and the DPF 52 is determined as being in failure to return. On the other hand, if the deference ΔINT between the actual regeneration interval $INT_{act}$ and the estimated regeneration interval $INT_{est}$ is equal to or less than the predetermined maximum threshold $\Delta T_{max}$ (No), then it proceeds to S210 and the DPF 52 is determined as being normal. Then, in S220, a count is incremented by one (n=n+1) and it returns to S120 to start the next calculation.

Next, referring to FIG. 8, a flow will be described when it is determined that the calculation of the estimated regeneration interval $INT_{est}$ is completed ($F_1$=1) in S130.

In S300, it is determined whether the predetermined threshold time elapses or not from when the completion flag $F_1$ is set ON. If the threshold time elapses (Yes), then it proceeds to S310 and it is determined whether the n-th (n=1) sensor regeneration is started or not.

In S310, if the sensor regeneration is not yet started (No), this means that the sensor regeneration start signal is not received even after the threshold time elapses from when the estimated regeneration interval $INT_{est}$ is calculated (as illustrated in FIG. 6(A)), then the present control proceeds to S320 and the DPF 52 is determined as being normal. Then, in S330, the count is incremented by one (n=n+1) and it returns to S120 to start the next calculation.

On the other hand, if the sensor regeneration is started (Yes) in S310, as the calculation of the actual regeneration interval $INT_{act}$ is completed, then in S340, the completion flag $F_2$ is set ON ($F_2$=1) to proceed to S350.

In S350, as the calculation of both of the actual regeneration interval $INT_{act}$ and the estimated regeneration interval $INT_{est}$ are completed, the comparison of those intervals is performed. If the difference HINT between the actual regeneration interval $INT_{act}$ and the estimated regeneration interval $INT_{est}$ exceeds the predetermined maximum threshold $\Delta T_{max}$ (Yes), then it proceeds to S370 and the DPF 52 is determined as being in failure to return. On the other hand, if the difference $\Delta INT$ between the actual regeneration interval $INT_{act}$ and the estimated regeneration interval $INT_{est}$ is equal to or less than the predetermined maximum threshold $\Delta T_{max}$ (No), then it proceeds to S320 and the DPF 52 is determined as being normal. Then, in S330, the count is incremented by one (n=n+1) and it returns to S120 to start the next calculation. Subsequently, the above mentioned steps will be repeatedly performed until the ignition key operation of the engine 10: OFF.

Next, the action and effect according to the diagnosis device of the present invention will be described below.

Conventionally, as a technique for diagnosing the failure of the DPF, a method has been known that the PM amount detection value of the resistive type PM sensor provided at the downstream side of the DPF is compared to the threshold value. However, as the electrical resistance of the PM deposited between the electrodes changes due to an influence of the exhaust gas temperature or the exhaust gas flow rate or the like, there is a problem that the deterioration of the DPF cannot be determined accurately according to the diagnosis method based on the PM amount detection value of the resistive type PM sensor.

To cope with this problem, according to the diagnosis device of the present invention, the failure of the DPF 52 is determined based on the actual regeneration interval $INT_{act}$, which is calculated from the sensor regeneration signal of the resistive type PM sensor 20, and the estimated regeneration interval $INT_{est}$, which is calculated from the PM slippage amount assuming the DPF 52 being normal, without using the PM amount detection value of the resistive type PM sensor 20. As a result, according to the diagnosis device of the present invention, it is possible to determine the failure of the DPF 52 with higher accuracy without being affected by the exhaust gas temperature or the exhaust gas flow rate or the like.

Also, according to the diagnosis device of the present invention, the DPF 52 is determined as being normal when the next sensor regeneration signal is not input, even after the predetermined time elapses from the completion of the calculation of the estimated regeneration interval. In other words, it is configured such that it can be determined earlier when the DPF 52 is normal without a need for waiting for the completion of calculation of the actual regeneration interval. As a result, according to the diagnosis device of the present invention, it is possible to achieve a shorten diagnosis time and an increased number of diagnoses effectively.

Also, according to the diagnosis device of the present embodiment, the DPF 52 is determined as being in failure when the calculation of the estimated regeneration interval is not yet completed even after the predetermined time elapses from the completion of the calculation of the actual regeneration interval. In other words, it is configured such that the failure can be determined earlier when the DPF 52 is considerably deteriorated without the need for waiting for the completion of the calculation of the estimated regeneration interval. As a result, according to the diagnosis device of the present invention, it is possible to detect the failure of the DPF 52 earlier.

Yet also, according to the diagnosis device of the present embodiment, the estimated regeneration interval is calculated from the PM slippage amount assuming the DPF 52 being normal. Also, the PM slippage amount is calculated from the model formula having the input value containing the intake and exhaust state quantity or the like of the engine 10. As a result, according to the diagnosis device of the present embodiment, it is possible to perform the diagnosis with higher accuracy in consideration of the operational status of the engine 10 compared to the configuration in which the actual regeneration interval is simply compared with the threshold value.

It should be noted that the present invention is not limited to the above-described embodiments and can be implemented with modifications, as appropriate, within the scope that does not depart from the spirit of the present invention.

For example, although the DPF 52 and DOC 51 are described as being provided separately, those can be instead integrally provided. Also, the engine 10 is not limited to the diesel engine and can be widely applied to other internal combustion engine such as a gasoline engine or the like.

The invention claimed is:
1. A diagnosis device comprising:
a filter that collects a particulate matter in an exhaust gas emitted from an internal combustion engine;
a sensor provided at a downstream side of the filter that detects an amount of the particulate matter based on a current flowing through the particulate matter deposited between electrodes,
wherein regeneration that combusts and eliminates the particulate matter from the sensor is performed when the particulate matter deposited between the electrodes is detected as reaching a predetermined amount; and
an electronic controller configured to
calculate an actual interval from a completion of the regeneration of the sensor to a start of a next regeneration,
estimate an amount of a particulate matter slippage in the exhaust gas that is emitted from the internal combustion engine and that slips through the filter, assuming a collection capability of the filter being normal,
calculate an estimated interval from the completion of the regeneration of the sensor to the start of the next regeneration based on the particulate matter slippage amount, and
determine at least failure of the filter by comparing the actual interval to the estimated interval,
wherein the sensor is forcibly regenerated when the internal combustion engine is started.
2. The diagnosis device according to claim 1, wherein the electronic controller determines that the filter is normal when the regeneration of the sensor is not started after a predetermined threshold time elapses from the completion of the calculation of the estimated interval.

3. The diagnosis device according to claim 1, wherein the electronic controller determines that the filter is in failure when the calculation of the estimated interval is not completed after a predetermined threshold time elapses from the completion of the calculation of the actual interval.

4. The diagnosis device according to claim 1, wherein the electronic controller determines that the filter is in failure when a difference between the actual interval and the estimated interval exceeds a predetermined maximum threshold.

5. The diagnosis device according to claim 1, wherein the electronic controller determines that the filter is in failure when a ratio of the actual interval to the estimated interval exceeds a prescribed maximum threshold.

6. The diagnosis device according to claim 1, wherein the electronic controller estimates the particulate matter slippage amount from a model formula having an input value containing an intake and exhaust state quantity that changes depending on an operational status of the internal combustion engine.

* * * * *